United States Patent
Olgun et al.

(10) Patent No.: US 9,722,454 B2
(45) Date of Patent: Aug. 1, 2017

(54) WIRELESS CHARGING APPARATUS INCLUDING AN ADAPTER THAT HOLDS A DEVICE TO BE CHARGED WITH A SIDE EXTERNAL TO THE WIRELESS CHARGING APPARATUS

(71) Applicant: Motorola Mobility LLC, Chicago, IL (US)

(72) Inventors: Ugur Olgun, Chicago, IL (US); Hugh K Smith, Palatine, IL (US)

(73) Assignee: Motorola Mobility LLC, Chicago, IL (US)

( * ) Notice: Subject to any disclaimer, the term of this patent is extended or adjusted under 35 U.S.C. 154(b) by 111 days.

(21) Appl. No.: 14/666,490

(22) Filed: Mar. 24, 2015

(65) Prior Publication Data

US 2016/0285298 A1 Sep. 29, 2016

(51) Int. Cl.
*H01M 10/46* (2006.01)
*H02J 7/02* (2016.01)

(52) U.S. Cl.
CPC .............. *H02J 7/025* (2013.01); *H02J 7/027* (2013.01)

(58) Field of Classification Search
CPC ........... H02J 7/0042; H02J 5/005; H02J 7/355
USPC .................. 320/107, 108, 114, 115; 307/104
See application file for complete search history.

(56) References Cited

U.S. PATENT DOCUMENTS

| 6,967,462 B1 | 11/2005 | Landis |
| 2015/0171658 A1* | 6/2015 | Manova-Elssibony . H02J 7/025 320/108 |

FOREIGN PATENT DOCUMENTS

WO  2013179284 A2  12/2013

OTHER PUBLICATIONS

Chong-Yi Liou, et al., "Wireless Charging System of Mobile Handset Using Metamaterial-Based Cavity Resonator" IEEE, 2012, 3 pages.
Sean Korhummel, et al., "Over-Moded Cavity for Multiple-Electronic-Device Wireless Charging", IEEE Transactions on Microwave Theory and Techniques, vol. 62, No. 4, Apr. 2014, pp. 1074-1079.

* cited by examiner

*Primary Examiner* — Edward Tso
(74) *Attorney, Agent, or Firm* — Matthew C. Loppnow; Watson Intellectual Property Group (57) ABSTRACT

A wireless charging apparatus can include an exciter that initiates and shapes electromagnetic fields of microwave frequency. The exciter can include a ground structure and a feed structure disposed within the ground structure. The wireless charging apparatus can also include an adapter configured to hold a device to be charged with a side of the device to be charged exposed external to the apparatus while charging the device to be charged. The adapter can transmit the microwave power from the exciter to the device to be charged.

20 Claims, 8 Drawing Sheets

WIRELESS CHARGING APPARATUS INCLUDING AN ADAPTER THAT HOLDS A DEVICE TO BE CHARGED WITH A SIDE EXTERNAL TO THE WIRELESS CHARGING APPARATUS

BACKGROUND

1. Field

The present disclosure is directed to a wireless charging apparatus. More particularly, the present disclosure is directed to a wireless charging apparatus that uses microwave power to charge a device to be charged while exposing a side of the device to be charged external to the wireless charging apparatus.

2. Introduction

Presently, mobile devices have revolutionized the way we live and have become an inseparable portion of many of our lives. Chemical batteries continue to be the default source of energy for these devices, as they have been for decades. At the dawn of the 21st century, rechargeable batteries began to overtake non rechargeable batteries in the consumer electronics market. Today, the U.S. demand for rechargeable batteries is growing twice as fast as that for non rechargeables. The most popular way of charging the rechargeable batteries is through some form of cabled connection that is attached to a power outlet. Hence, most portable electronic devices are built with connectors to allow a cabled connection for charging. These connectors occupy valuable real estate, limit the flexibility of the mobile device design, and introduce complications to the mechanical integrity of the device. Harsh environment conditions that mobile devices experience accelerate the degradation of the functionality and cosmetic look of components used for the connectors. For example, accumulation of dust and dirt in the charging connectors, broken charger connector covers, and other degradation shortens the device lifetime. Elimination of these charging connectors offers significant benefit to portable electronic device users.

Recently, wireless charging for mobile devices has been introduced to combat the above mentioned disadvantages of the cabled charging of internal rechargeable batteries. Wireless power transfer based on inductive coupling is considered as a promising way of wirelessly charging internal rechargeable batteries and has gained commercial success in the marketplace. The Wireless Power Consortium has established a standard for this technology called Qi. Systems that fall within the scope of this standard are those that use inductive coupling to provide power transfer between two planar coils, one of which is a transmitter and the other one is a receiver.

In current implementations of the Qi standard, high permeability ferrite sheets are employed to electrically separate a planar charging coil of the electronic device from metal, such as a device printed circuit board ground or the device battery. These sheets, however, introduce a thickness of somewhere between 0.5 mm to 1.0 mm into the mobile device. This is, of course, in addition to the thickness already introduced by the coils and mechanical components to keep the assembly secure. Unfortunately, despite the fact that reducing the device thickness is strongly desired, these sheets add even more thickness to the existing device thickness. In addition, there are material choice considerations that should be undertaken when inductive charging technology is used. For example, presence of metal in the coupling aperture would inhibit inductive charging of the device.

Thus, there is a need for a wireless charging apparatus that uses microwave power to charge a device to be charged.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

Embodiments provide a wireless charging apparatus that uses microwave power to charge a device to be charged. According to a possible embodiment, the wireless charging apparatus can include an exciter that initiates and shapes electromagnetic fields of microwave frequency. The exciter can include a ground structure and a feed structure disposed within the ground structure. The wireless charging apparatus can also include an adapter configured to hold a device to be charged with a side of the device to be charged exposed external to the apparatus while charging the device to be charged. The adapter can transmit microwave power from the exciter to the device to be charged.

Such a wireless charging apparatus that uses microwave power to charge a device to be charged can eliminate the need for dedicated charging connectors and the additional hardware needed by inductive wireless charging. This can be accomplished through utilization of existing radio frequency hardware, such as an antenna, on the device to be charged for charging.

Figure 1:
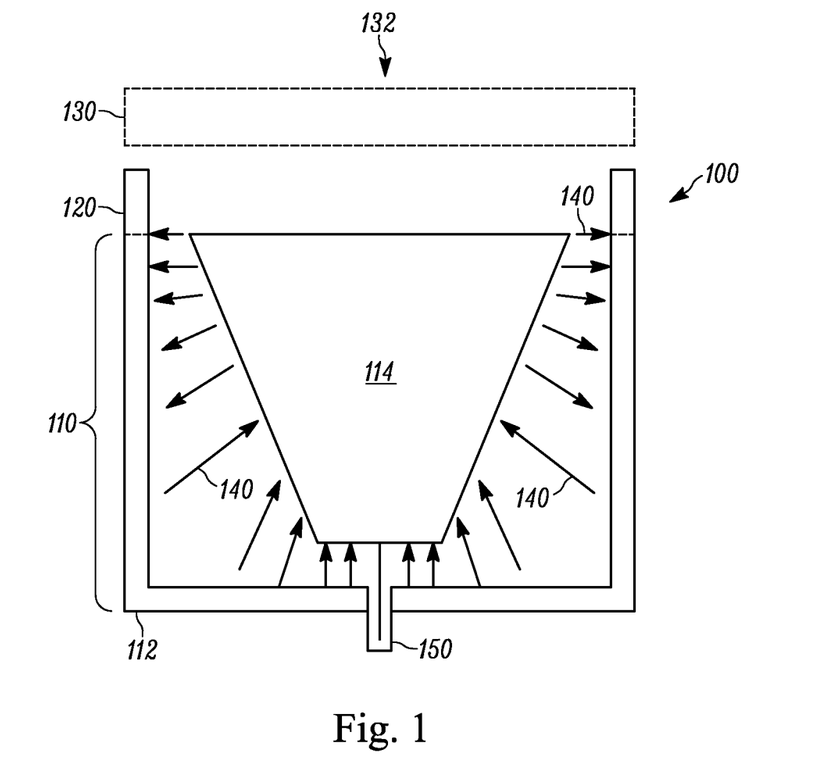
FIG. 1 is an example illustration of a wireless charging apparatus according to a possible embodiment.

FIG. 1 is an example illustration of a wireless charging apparatus 100 according to a possible embodiment. The apparatus 100 can include an exciter 110 that initiates and shapes electromagnetic fields of microwave frequency. The exciter 110 can include a ground structure 112 and a feed structure 114 disposed within the ground structure 112. The apparatus 110 can also include an adapter 120 configured to hold a device to be charged 130 with a side 132 of the device to be charged 130 exposed external to the apparatus 100 while charging the device to be charged 130. The adapter 120 can transmit the microwave power from the exciter 110 to the device to be charged 130. The exciter 110 can be configured to operate at a same microwave frequency as an antenna (not shown) of the device to be charged 130. The antenna of the device to be charged 130 can be used to receive the transmitted microwave power, which can be subsequently rectified into direct current to charge a battery of the device to be charged 130. For example, the adapter 120 can transmit the microwave power from the exciter 110 to the device to be charged 130. Then, the device to be charged 130 can convert the received microwave power to direct current through rectification and charge its internal battery. The microwave frequency can be a frequency of at least 500 MHz. The microwave frequency can also be frequency of at least 650 MHz, of at least 690 MHz, of at least 750 MHz, of at least 790 MHz, of at least 1 GHz, of at least 2 GHz, between 2-3 GHz, around 5 GHz, and other microwave frequencies.

The exciter ground structure 112 and the adapter 120 can be a unitary structure or can be separate structures. For example, the exciter ground structure 112 and the adapter 120 can be made of the same material and can be part of the same structure. Alternately, the exciter ground structure 112 and the adapter 120 can be separate structures and different interchangeable adapters can be attached to the exciter 110 to attach different devices to be charged to the apparatus 100.

The exciter 110, the adapter 120, and the device to be charged 130 can create a structure that facilitates the transfer of power from the exciter 110 to the device to be charged 130 when the device to be charged 130 is attached to the adapter 120. At least the feed structure 114 and the ground structure 112 can control an input impedance of the exciter 110 and an electric field distribution 140 in the volume between them. At least the feed structure 114 and the ground structure 112 can also control an electric field distribution 140 at an interface between the exciter 110 and the device to be charged 130. Furthermore, the adapter 120 can provide optimum power transfer between the exciter 110 and the device to be charged 130. For example, a shape of an inner wall of the adapter 120, a filling material of the adapter 120, a cross sectional profile of the adapter 120, and the adapter height can provide proper impedance matching and optimum power transfer between the exciter 110 and the device to be charged 130.

The exciter 110 and the adapter 120 can further provide an open waveguide that is terminated by the device to be charged 130 when the device to be charged 130 is attached to the adapter 120. For example, the exciter 110 and the adapter 120 can provide a coaxial interface (not shown) that is terminated by the device to be charged 130. To elaborate, the apparatus 100 can be designed as a structure that performs an impedance transformation from a coaxial cable attached at a connector 150 to an antenna port of the device to be charged. Thus, if the device to be charged 130 is not present, the majority of the microwave power can be reflected back to the connector 150. The apparatus 100 can be intrinsically designed to provide good coupling efficiency to the device to be charged 130 and reduce total charging time.

The feed structure 114 can be a conductive truncated cone and the ground structure 110 can be a conductive tube in which the truncated cone is disposed within. The ground structure 110 can be closed on one side with a conductive plate, which can allow a through RF connection to be attached via a connector 150 to the feed structure 114. The volume between the conductive inner walls of the ground structure 110 and the conductive outer walls of the feed 114 can be filled with at least one non conductive material or left in vacuum. The feed structure 114 and/or the ground structure 112 can also be elliptical, cylindrical, rectangular, pyramidal, conical, or any other shape. The device to be charged 130 can be a user portable electronic device. For example, a user portable electronic device can be any device that is easily portable by a user, such as a cellular phone, a smartphone, a smart watch, a laptop computer, a portable video game, a multimedia player, or any other electronic device that is easily portable by a user.

Figure 2A:
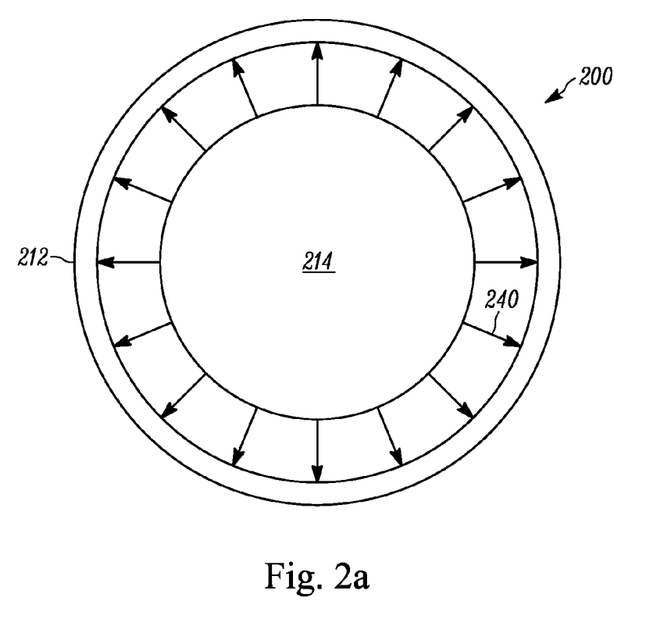
FIGS. 2a and 2b are example illustrations of the electric and magnetic fields, respectively, at the interface section between a wireless charging apparatus and a device to be charged when a device to be charged is not present.
Figure 2B:
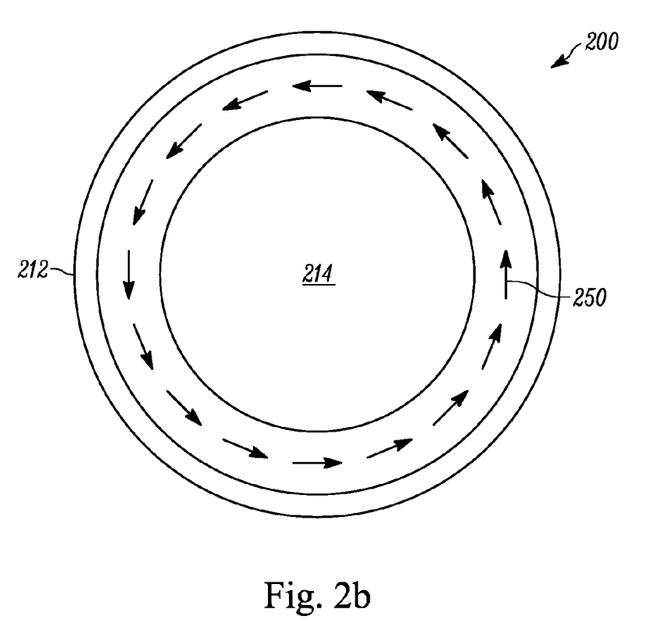

FIGS. 2a and 2b are example illustrations of the electric and magnetic fields, respectively, at the interface section between a wireless charging apparatus 200 and a device to be charged when a device to be charged is not present. A wireless charging apparatus 200 is a possible embodiment, similar to the wireless charging apparatus 100. The ground structure 212 and the feed structure 214 of the exciter of the apparatus 200 can establish an electric and magnetic field distribution at the interface such that E-fields 240 and H-fields 250 are uniformly distributed when a device to be charged is not attached to the adapter, where an E-field can be an electric field and an H-field can be a magnetic field.

Figure 3:
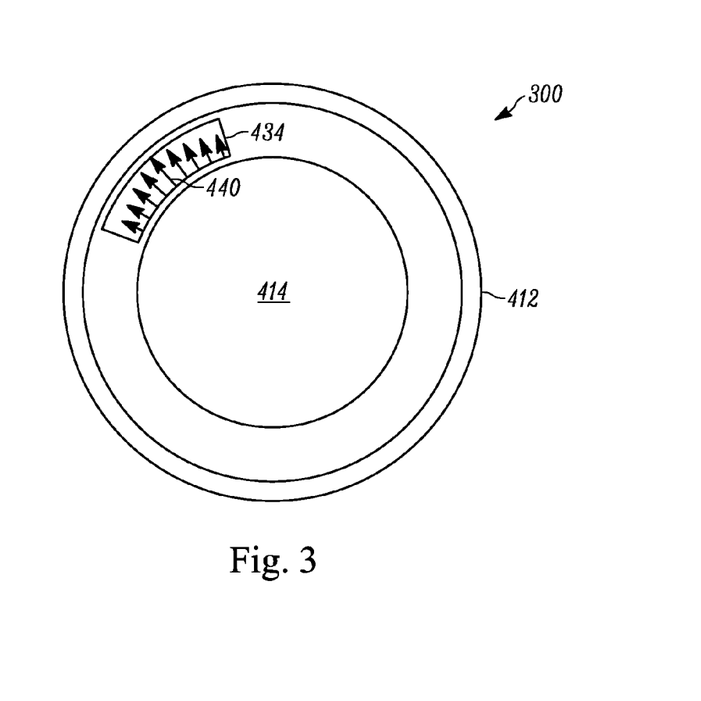
FIGS. 3 and 4 are example illustrations of electric fields of a wireless charging apparatus with a device to be charged according to a possible embodiment.
Figure 4:
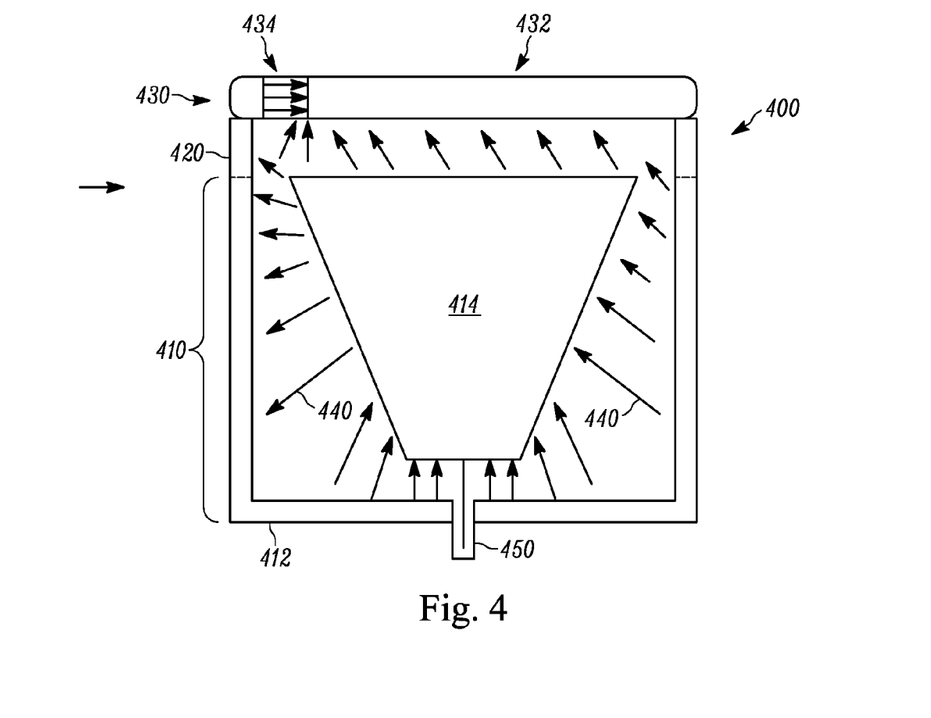

FIG. 3 is an example top view of the wireless charging apparatus 400 according to a possible embodiment. FIG. 4 is an example side view of the wireless charging apparatus 400 according to a possible embodiment. The top view of the wireless charging apparatus 400 depicts the distribution of the electric fields 440 in the antenna aperture 434 of the device to be charged 430 when a device to be charged attaches to the exciter 410 via the adapter 420 shown in the side view. As shown in the side view, the ground structure 412 and the feed structure 414 of the exciter 410 can establish an electromagnetic field distribution at a charger 400—device to be charged 430 interface such that E-fields 440 align themselves with the antenna aperture 434 of the device to be charged when the device to be charged is attached to the adapter 420. Comparing FIG. 3 to FIG. 2a reveals that when the device to be charged and adapter are present, the electric fields 440 generated by the exciter structures 412 and 414 are concentrated in the antenna aperture 434 of the device to be charged. Hence, a device to be charged can be free to rotate/move in the charging plane as long as it maintains good power coupling with the adapter, similar to a Qi wireless charging system.

Figure 5:
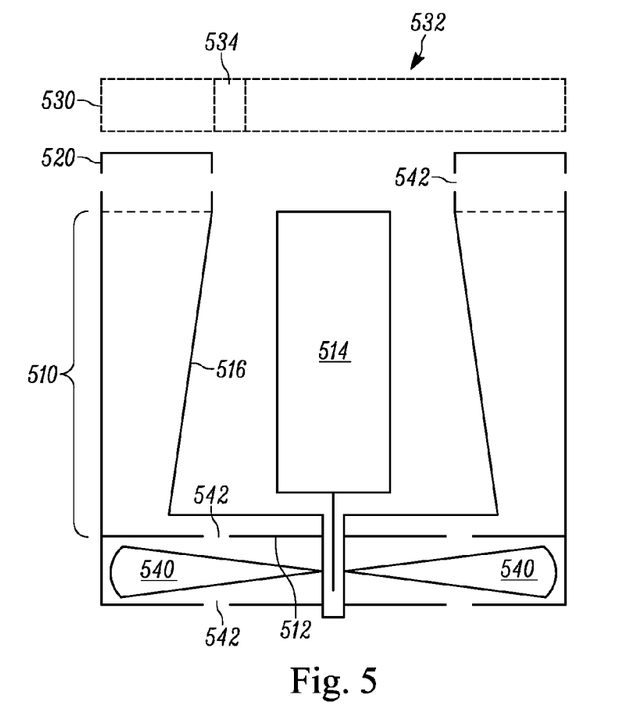
FIG. 5 is an example illustration of a wireless charging apparatus according to a possible embodiment.

FIG. 5 is an example illustration of a wireless charging apparatus 500, similar in concept to the wireless charging apparatus 100, according to a possible embodiment. The apparatus 500 can include an exciter 510 that initiates and shapes electromagnetic fields of microwave frequency. The exciter 510 can include a ground structure 512 and a feed structure 514 disposed within the ground structure 512. The apparatus 510 can also include an adapter 520 configured to hold a device to be charged 530 with a side 532 of the device to be charged 530 exposed external to the apparatus 500 while charging the device to be charged 530 via an antenna 534 of the device to be charged 530. As shown, according to different embodiments, a wireless charging apparatus can take various shapes. In the present embodiment, the feed structure 514 can be cylindrical and the ground structure 512 can have a curved side 516 facing the feed structure 514.

The apparatus 500 can also include a cooling fan 540 at an opposite side of the exciter 510 from the adapter 520. The cooling fan 540 can provide airflow within the apparatus 500 to cool the apparatus 500 and the device to be charged 530 while the device to be charged 530 is attached to the apparatus 500 and being charged. The apparatus 500 can also include at least one aperture 542 in the exciter 510 and/or the adapter 520. According to different embodiments, the at least one aperture 542 can include at least two, three, or more apertures. The at least one aperture 542 can provide for airflow from the cooling fan 540 through the apparatus 500. A diameter of the at least one aperture 542 can be small enough to reduce emissions of microwave energy from the exciter 510 through the aperture 542. Thus, a cooling fan 540 can be embedded below the exciter 510 area to provide airflow within the apparatus 500, which can cool the device to be charged 530 while it is charging. The exciter 510 and the adapter 520 can have apertures 542, such as holes, through their walls to allow for airflow without compromising coupling efficiency.

Figure 6:
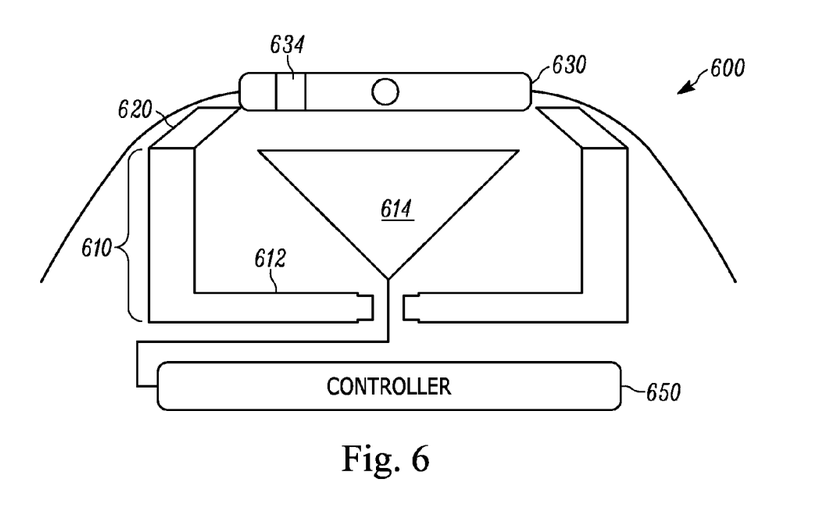
FIG. 6 is an example illustration of a wireless charging apparatus according to a possible embodiment.

FIG. 6 is an example illustration of a wireless charging apparatus 600, such as the wireless charging apparatus 100, according to a possible embodiment. The apparatus 600 can include an exciter 610 and an adapter 620. The adapter 620 can couple the exciter 610 with a device to be charged 630, such as a smartwatch, that has an antenna 634, such as a slot antenna, a planar inverted-F antenna, or any other antenna that can be used on a device to be charged. The exciter 610 can include a ground 612 and a feed 614.

The apparatus 600 can also include a controller module 650. The controller module 650 can be integral with the apparatus 600, can be connected to the apparatus 600, can be distributed throughout and/or separate from the apparatus 600, or can be anywhere else useful for controlling the apparatus 600. The controller module 650 can provide and regulate microwave power to the apparatus 600. The controller module 650 can include software, hardware, circuitry, modules, an antenna, and other components useful for operating a wireless charging apparatus. For example, the controller module 650 can include a bi-directional coupler that can monitor reflected microwave power to determine the presence of the device to be charged 630. If the device to be charged 630 is not present or is fully charged, majority of power may be reflected back to the controller module 650 and the reflected power can be detected by the bi-directional coupler in the controller module 650. The controller module 650 can also provide sensor antennas (not shown) located along a rim of the adapter 620, where the sensor antennas can monitor leakage of the microwave power. The power sent to the exciter 610 can be adjusted in accordance with the data from the sensor antennas.

Figure 7:
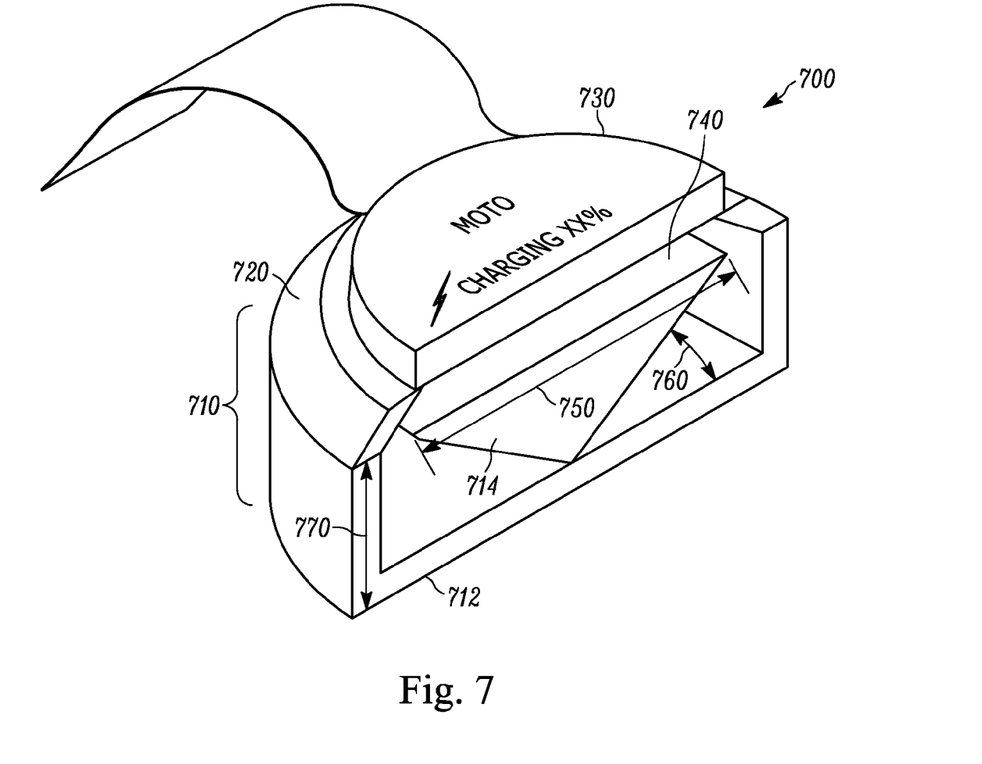
FIG. 7 is an example illustration of a wireless charging apparatus according to a possible embodiment.

FIG. 7 is an example illustration of the wireless charging apparatus 700 according to a possible embodiment. The feed structure 714 can be a conductive cone with a diameter 750 and a cone angle 760. A height 770 of the ground structure 712 and a cone angle 760 and diameter 750 of the cone can control an input impedance of the exciter 710 and an electromagnetic field distribution at an interface of the exciter 710. The feed structure 714 can also have a cross-sectional area 740 in a plane perpendicular to a direction from the adapter 720, where the cross-sectional area 740 becomes smaller in a direction away from the adapter 720. For example, the feed structure 714 can have a diameter 750 that tapers away from the device to be charged 730.

Embodiments can provide for a wireless charging technique that has the design freedom and engineering flexibility of an inductive coupling charging device, but does not require the bulky ferrite sheets needed for inductive charging in the device to be charged. The disclosed microwave based power transmission and charging can reach this goal. Many mobile electronics are already equipped with antennas to perform wireless communications and their existing antenna hardware can be reused for wireless charging, which results in valuable real estate savings on a mobile device. Embodiments, such as the apparatus 700 and those in other embodiments, provide an electromagnetic power guide that is terminated by the device to be charged, such as the device 730.

Embodiments can provide a charging device, such as the apparatus 700 and those in other embodiments, for mobile devices that have an antenna for wireless communication and a rechargeable energy storage unit, such as a battery, for power. The charging devices in some embodiments combine an exciter that initiates and then shapes electromagnetic fields of microwave frequency, an adapter that transmits the power from the exciter to the device to be charged, and the device to be charged. The antenna on the device to be charged and the exciter structure can be designed to operate at the same frequency.

An adapter, such as the adapter 720 and those in other embodiments, can enable a multitude of different design options. The adapter can also maximize the electromagnetic power transfer to the device to be charged while minimizing the power leakage from the system. As such, the adapter can be understood as an impedance matching medium between the exciter and the device to be charged.

The adapter can take various shapes to accomplish the primary design goal. It can be a hollow metal structure with its two ends open or it could be filled with nonconductive material, such as low loss dielectric, enclosed by a metal wall. The outer surface of the metal wall can be shaped to match the physical dimensions of the exciter on one end, and the device to be charged on the other. This adapter can have additional features which facilitate the mating of device to be charged with the exciter. The shape of the inner wall, the filling material, and the adapter height are additional mechanisms that can achieve proper impedance matching between the exciter and the device to be charged. The adapter could also be a coaxial structure in which the interface between the adapter and the exciter results in a coaxial connection. Disclosed design approaches can provide a microwave wireless charging device that can emulate the commercial Qi wireless charging pad experience. As such, the device to be charged can be placed on a charging mat with its display visible to the consumer while being charged. Similar to Qi, an efficient wireless energy transfer can be feasible with this design approach.

Figure 8:
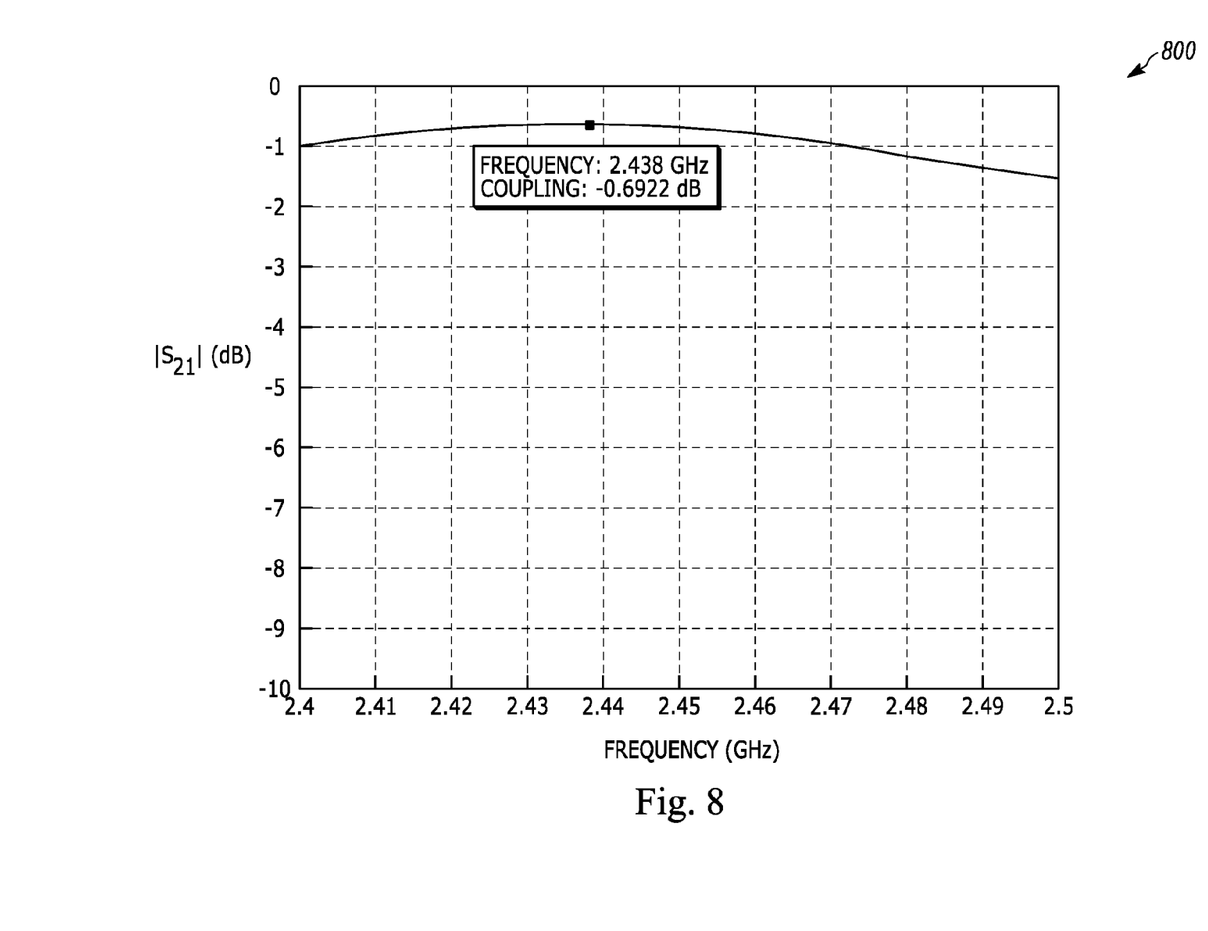
FIG. 8 is an example graph showing an amount of power transferred from a wireless charging apparatus to a device to be charged according to a possible embodiment.

FIG. 8 is an example graph 800 showing the amount of power transferred from the wireless charging apparatus 600 to the device to be charged 630 according to a possible embodiment. The graph 800 reveals that approximately 85% of the power sent from an exciter 610 is transferred to the antenna 634 of the device to be charged 630.

Figure 9:
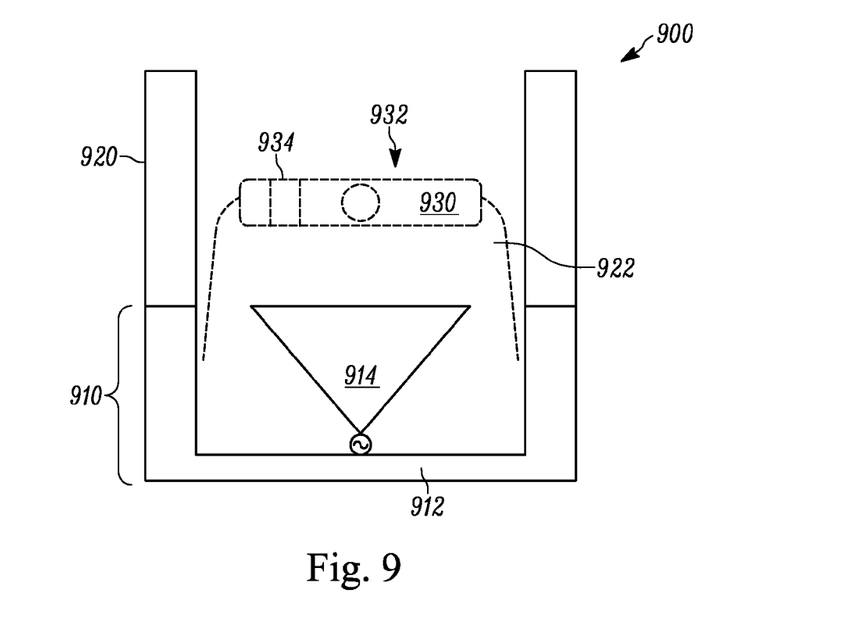
FIG. 9 is an example illustration of a wireless charging apparatus according to a possible embodiment.

FIG. 9 is an example illustration of a wireless charging apparatus 900, similar in concept to the wireless charging apparatus 100, according to a possible embodiment. The apparatus 900 can include an exciter 910 and an adapter 920. The adapter 920 can couple the apparatus with a device to be charged 930, such as a smartwatch, that has an antenna 934, such as a slot antenna, a planar inverted-F antenna, or any other antenna that can be used with a device to be charged. The exciter 910 can include a ground 912 and a feed 914.

As mentioned earlier, an adapter can take various shapes to maximize the power transfer from an exciter to a device to be charged and still be consumer friendly. This tubular adapter 920 design can be based on a simple waveguide structure, such as a hollow conductive metal pipe. In this embodiment, one end of the adapter 920 does not have to physically match the shape of the device to be charged 930. For example, as shown, the device to be charged 930 can be placed within the adapter 920. According to another embodiment, the adapter can open up like a vase. In this embodiment, the corresponding hollow structure 922 can be filled from its exciter end with nonconductive material, such as a very low loss dielectric, up to a certain height. Then, the device to be charged 930 can be placed on top of the dielectric filling but metal walls of the adapter 920 can continue extending away. An exposed side 932 of the device to be charged 930 can still be visible when viewed from the top. The dimensions of the resulting waveguide can be chosen such that the wave propagation in it can be evanescent in nature. As such, the electromagnetic fields would exhibit exponential decay as a function of distance from exposed side 932 of the device to be charged towards the open end at the top of adapter 920 and leakage from the system can be minimized.

Figure 10:
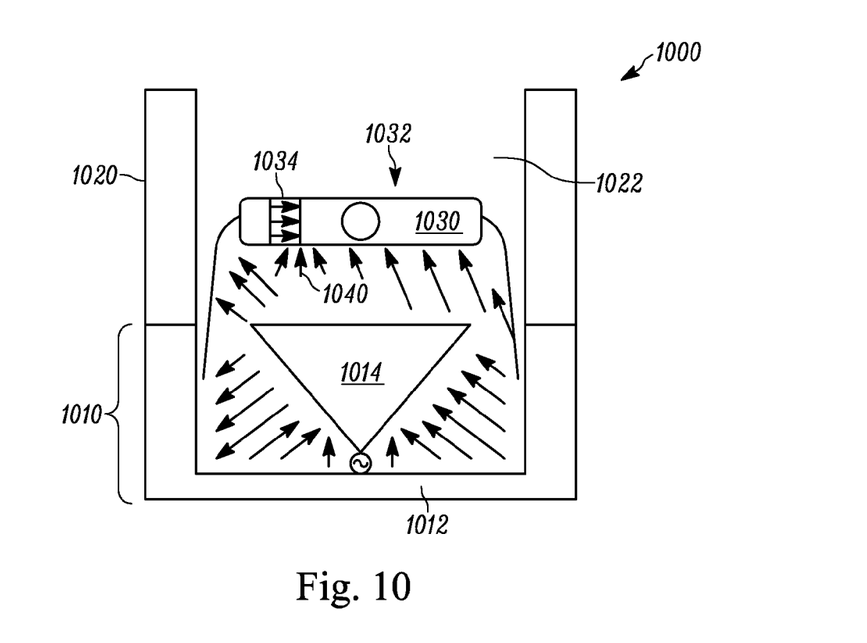
FIG. 10 is an example illustration of an electric field distribution on a tubular adapter of a charging apparatus according to a possible embodiment.

FIG. 10 is an example illustration of electric field distribution on the tubular adapter 1020 of the charging apparatus 1000 when the device to be charged 1030 is present and charging according to a possible embodiment. As shown, electric fields transmitted from the exciter 1010 can be concentrated onto the antenna aperture 1034 of the device to be charged 1030 and any remaining electric field can decay quickly as it approaches the exit of the tube 1020. As such, power leaving the system can be minimized.

Figure 11:
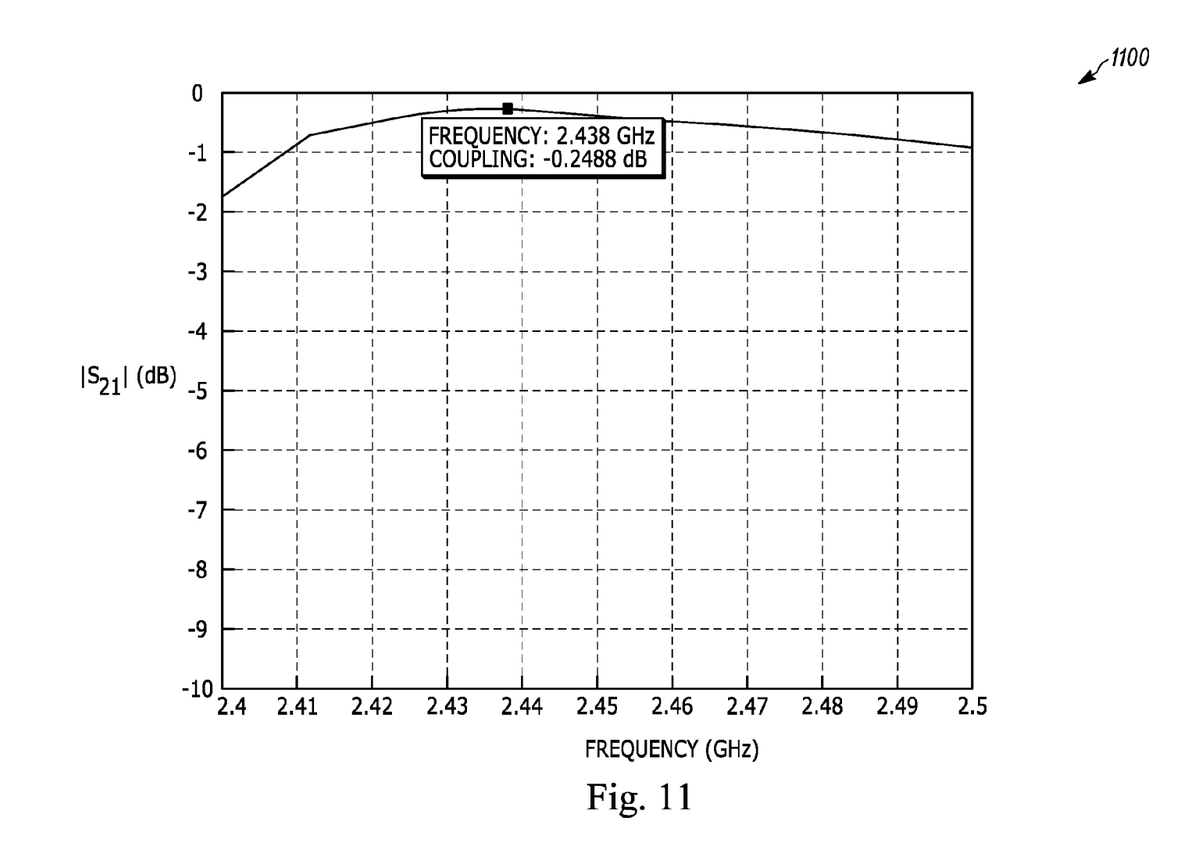
FIG. 11 is an example graph showing an amount of power transferred from a wireless charging apparatus to a device to be charged according to a possible embodiment.

FIG. 11 is an example graph 1100 according to a possible embodiment. The graph 1100 illustrates that approximately 95% of the power sent from a tubular adapter 1020 and exciter 1010 made its way to the antenna of the device to be charged. This efficiency demonstrates good coupling between the exciter and the device to be charged with the tubular adapter design.

At least some embodiments can provide for improved efficiency and consumer friendliness of a microwave wireless charging device when the exciter structure establishes an electric and magnetic field distribution at the interface with device to be charged such that electric and magnetic fields are uniformly distributed, when device to be charged is not attached. These uniform electromagnetic field distributions afford a certain amount of flexibility on the placement of the device to be charged. At least some embodiments can ensure maximized electromagnetic energy transfer to the adapter by providing the uniform electromagnetic field distribution at the exciter exit. In addition, at least some embodiments can enable an adapter design that can make the wireless charging process at least partially impervious to the placement and orientation of the device to be charged.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" followed by a list is defined to mean one, some, or all, but not necessarily all of, the elements in the list. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A wireless charging apparatus comprising:
    an exciter that initiates and shapes microwave power, the exciter comprising:
        a ground structure; and
        a feed structure disposed within the ground structure; and
    an adapter configured to hold a device to be charged with a side of the device to be charged external to the apparatus while charging the device to be charged, the adapter configured to transmit the microwave power from the exciter to the device to be charged.

2. The apparatus according to claim 1, wherein the exciter, the adapter, and the device to be charged create a structure that facilitates the transfer of microwave power to the device to be charged when the device to be charged is attached to the adapter.

3. The apparatus according to claim 1, wherein the exciter establishes electromagnetic fields that concentrate on an antenna aperture of the device to be charged when the device to be charged is attached to the adapter.

4. The apparatus according to claim 1, wherein the exciter establishes an electromagnetic field distribution at an interface between the apparatus and the device to be charged such that electromagnetic fields are uniformly distributed when the device to be charged is not attached to the adapter.

5. The apparatus according to claim 1, wherein the feed structure and the ground structure control an input impedance of the exciter and an electromagnetic field distribution at an interface between the exciter and the device to be charged.

6. The apparatus according to claim 1,
wherein the feed structure comprises a conductive truncated cone with a diameter and a cone angle, and
wherein a height of the ground structure and the cone angle, lower diameter, and upper diameter of the truncated cone control an input impedance of the exciter and an electromagnetic field distribution at an exit of the exciter.

7. The apparatus according to claim 1,
wherein the feed structure comprises a cone, which can be truncated, and
wherein the ground structure comprises a tube with the cone disposed within the tube.

8. The apparatus according to claim 1, wherein the feed structure comprises a truncated cone with a cross-sectional area in a plane perpendicular to a direction from the adapter, where the cross-sectional area becomes smaller in a direction away from the adapter.

9. The apparatus according to claim 1, wherein the exciter and the adapter provide at least one of a coaxial interface and an open waveguide that is terminated by the device to be charged.

10. The apparatus according to claim 1, wherein the microwave frequency comprises a frequency of at least 500 MHz.

11. The apparatus according to claim 1, wherein the adapter comprises an impedance matching medium between the exciter and the device to be charged.

12. The apparatus according to claim 11, wherein a shape of an inner wall of the adapter, a filling material of the adapter, and the adapter height provide proper impedance matching between the exciter and the device to be charged.

13. The apparatus according to claim 1, further comprising:
a cooling fan located at an opposite end of the exciter from the adapter, the cooling fan providing airflow within the apparatus to cool the device to be charged, and
at least one aperture in at least one of the exciter and the adapter, the aperture allowing airflow from the cooling fan, wherein a diameter of the aperture is small enough to reduce emissions of radio frequency energy from the exciter through the aperture.

14. The apparatus according to claim 1, further comprising a directional coupler configured to monitor reflected power to determine the presence of the device to be charged.

15. The apparatus according to claim 1, wherein the exciter is configured to operate at a same microwave frequency as an antenna of a device to be charged.

16. The apparatus according to claim 1, wherein the exciter ground structure and the adapter are one of a unitary structure and separate structures.

17. A wireless charging apparatus comprising:
an exciter configured to operate at a same frequency of an antenna of a device to be charged, where the antenna of the device to be charged is used for wireless communication, where the exciter initiates and shapes electromagnetic fields, the exciter comprises:
a ground structure; and
a feed structure disposed in a volume within the ground structure; and
an adapter configured to hold a device to be charged with a side of the device to be charged physically external to the apparatus while charging the device to be charged, the adapter configured to transmit the microwave power from the exciter to the device to be charged.

18. The apparatus according to claim 17, wherein the exciter and the adapter provide at least one of a coaxial interface and an open waveguide that is terminated by the device to be charged.

19. The apparatus according to claim 17, wherein the exciter, the adapter, and the device to be charged create a structure that facilitates the transfer of microwave power to the device to be charged when the device to be charged is attached to the adapter.

20. A wireless charging apparatus comprising:
an exciter configured to operate at a same frequency of an antenna of a device to be charged, where the exciter initiates and shapes microwave energy at a frequency of at least 500 MHz, where the exciter comprises:
a ground structure; and
a feed structure that is driven against the ground structure; and
an adapter configured to hold a device to be charged with a side of the device to be charged external to the wireless charging apparatus while charging the device to be charged, the adapter configured to transmit the microwave power from the exciter to the device to be charged,
wherein the exciter and the adapter provide a mechanism to transfer microwave power that is terminated by the device to be charged, and
wherein the exciter, the adapter, and the device to be charged create a structure that facilitates the transfer of microwave power to the device to be charged when the device to be charged is attached to the adapter, where the side of the device to be charged is external to the microwave power within the structure while charging the device to be charged.

* * * * *